Jan. 14, 1930.  J. D. BROADFOOT  1,743,593
ELECTRICAL DEVICE FOR RECHARGING BATTERIES
Filed Dec. 28, 1923

INVENTOR.
JAMES D. BROADFOOT.
BY
*Charles E. Wisner*
ATTORNEY.

Patented Jan. 14, 1930

1,743,593

UNITED STATES PATENT OFFICE

JAMES D. BROADFOOT, OF CHATHAM, ONTARIO, CANADA, ASSIGNOR, BY MESNE ASSIGNMENTS, TO ECLIPSE ELECTRIC COMPANY, A CORPORATION OF DELAWARE

ELECTRICAL DEVICE FOR RECHARGING BATTERIES

Application filed December 28, 1923. Serial No. 683,102.

This invention relates to electrical devices for recharging batteries, and the principal object of the invention is to provide means to cause a surging in the flow of the electric current in the charging of storage batteries.

Heretofore, the ordinary storage battery for use in automobiles and for the various purposes for which storage batteries are utilized have been charged by the usual low-amperage electric current to which the battery is subjected for a considerable period of time. I have discovered that, by subjecting the battery to a current flowing in surges alternately of a very high and comparatively low amperage and at constant voltage, the battery may be charged in a comparatively short period of time—namely, about one-half to three-fourths of an hour where with the methods heretofore in use approximately forty hours are required to properly charge a battery.

This invention relates to the mechanism utilized in the circuit for charging a battery, the method of charging being more fully described in a companion application.

The principal feature of this invention is in the provision of means for causing the current to surge or to rapidly pulsate in successive periods of high and low amperage ranging between as high as one hundred amperes (depending upon the battery and its condition) and falling to twenty-five or thirty-five amperes and repeating.

These objects and the various novel features of the invention are hereinafter more fully described and claimed, and the preferred form of construction of a mechanism hereinafter termed a rheostat embodying my invention is shown in the accompanying drawings in which—

Figure 2:
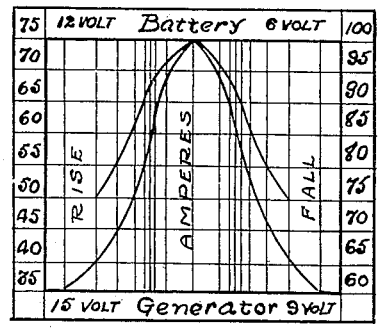
Fig. 2 is a side view partly in section of the device.

The device comprises a slab or plate $A$ of insulating material, for instance slate which is supported on a shaft $G$ extending centrally therethrough, which shaft is mounted in brackets $M, M$ secured on the base $L$ as shown clearly in Fig. 2. On this shaft is a pulley $N$ and the slab $A$ is held stationarily as will be understood from the drawings. Mounted on the shaft and rotatable therewith is a spider having the three arms $D^1$, $D^2$ and $D^3$, each of which carry a brush $F^1$, $F^2$ and $F^3$ respectively. Bolted to the slab $A$ is a contact ring $C$ spaced from the shaft and toward the periphery of the plate or slab $A$ is a series of contact segments $B^1$, $E^2$, $B^3$, $B^4$, $B^5$, $E^6$, $B^7$, $B^8$, $B^9$, $E^{10}$, $B^{11}$, $B^{12}$, $B^{13}$, $E^{14}$, $B^{15}$ arranged in a circle. The segments are all of similar form and are bolted to the slab in spaced relation as indicated. Attached to each of the segments are the binding posts $O$. These binding posts are all connected to a heavy resistance coil $H$ cutting into the coil in spaced relation, a certain definite part of the coil being interposed between each two binding posts. The coil forms a complete circle as indicated. The battery $I^1$ to be charged may be connected to the segment $E^2$ at $P$; the battery $I^2$ may be connected with the segment $E^6$ at $T$; the battery $I^3$ may be connected with the segment $E^{10}$ at $R$, and the battery $I^4$ may be connected with the segment $E^{14}$ at $S$. The brushes $F^1$, $F^2$ and $F^3$ electrically connect the segments successively with the inner contact ring $C$ which has the line $K$ attached thereto at $Q$, the line $K$ leading to the generator. The spider containing the brushes is driven in a clock-wise direction by connection for instance from the generator or other source of power through the pulley $N$. The segments $E^2$, $E^6$, $E^{10}$ and $E^{14}$ are equidistantly spaced being positioned at four points in the circle so that the brushes during a revolution of the spider come into contact with only one of the said segments at a time.

As an instance of operation of the device, let it be considered that only one battery $I^1$ is to be charged which has a connection at $P$ with the segment $E^2$ through the line $J$. With the brush $F$ contacting the segment $E^2$ and the inner ring the full amperage of current from the generator is discharged to the battery. As the spider arm $D^1$ moves the brush $F$ from the segment $E^2$ to the segment $B^3$ a portion of the resistance is cut into the circuit and causes the current to pass through the segments $B^3$ and coil H to the post for the segment $E^2$ and this lowers the amperage and as there is less resistance between this particular brush $F^1$ and post P than between the other brushes and the post all the current will pass through the brush $F^1$ and no current will flow through the other brushes. As the arm $D^1$ carrying the brush $F^1$ travels further forward and connects on the segment $B^5$ for instance the amperage is further reduced as a greater amount of resistance is cut into the circuit. While this arm $D^1$ is moving forward and lowering the amperage of current flowing to the battery the arm $D^3$ is moving upward toward the segment $E^2$ and at a certain point of its movement begins to raise the amperage from the left side by a portion of the flow going through the brush $F^3$ to the segment $B^{15}$ and thence through the resistance to the connection P and battery $I^1$. When the arm $D^1$ is moved to the segment $B^7$ the arm $D^3$ will have come into contact with the segment $E^2$ which again permits a full amperage of current to the battery and as this arm $D^3$ then moves forward and lowers the amperage the succeeding arm raises on the left side and comes to a point where some of the current flows therethrough to raise the amperage until the third arm $D^2$ comes into contact with the segment $E^2$ thereby again raising the current flow to full amperage. If it is desired to charge additional batteries the same are connected as indicated for the batteries $I^2$, $I^3$ and $I^4$ and, by operating four circuits at one time, the amperage is equally distributed to each battery.

Figure 1:
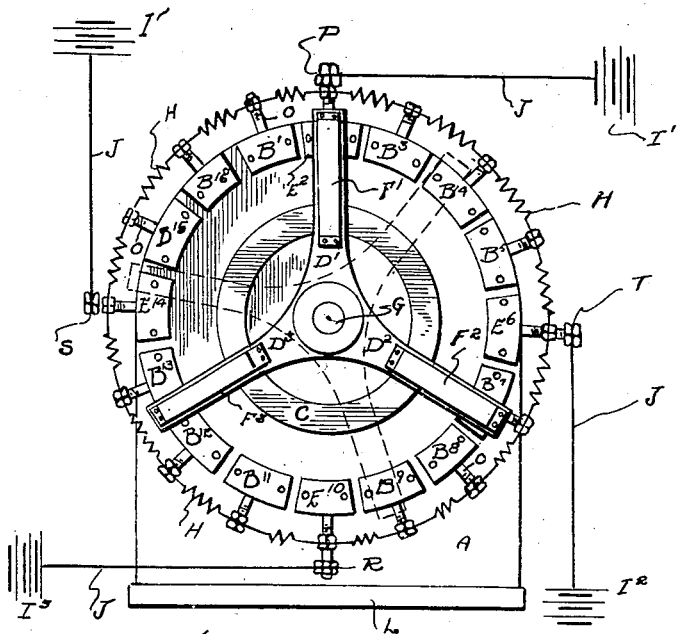
Fig. 1 is a side elevation of the rheostat.
Figure 3:
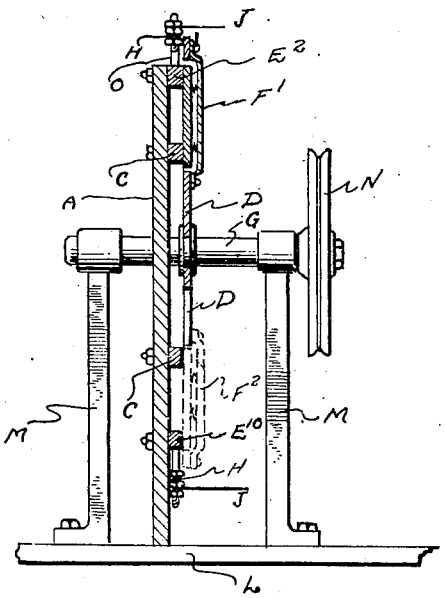
Fig. 3 is a diagram showing the rise and fall in the amperes.

It will be seen from the above description that the action of the revolving spider causes a successive rise and fall in the amperage of the current flowing to the batteries. This effect is illustrated in Fig. 3 indicating the flow of current for a six or twelve volt battery upon the right and left hand side respectively of the diagram. The voltage of the generator for a six volt battery should be about nine volts while that for a twelve volt battery should be fifteen volts. The curved line at the right side of Fig. 3 starting at 60 and rising to 100 shows an instance of rise and fall in amperes when charging a single battery and the outside curved line starting at 25 and rising to 100 shows the rise and fall in amperage when two to four batteries are connected to the rheostat. On the left side of the diagram the curved line starting at 35 and rising at 75 shows the amperage pulsation in charging a single twelve volt battery and the outside curved line starting at 0 and rising to 75 shows how the spider distributes the amperes from 50 to 75 when two to four batteries are connected to the rheostat. It can readily be understood that a circuit and segments for a twelve volt battery could be placed on the opposite side of the plate or slab A and operated at the same time a six volt battery is being charged. In any of the instances illustrated it is evident that the current is caused to surge into the battery rising and falling between a high and a low amperage. It is also to be noted that the rheostat may be constructed with greater or less amount of resistance between the posts of the segments and the extent of the rise and fall in amperage varied as may be desired. I have found that this surging of current between a very high amperage and considerably lower amperage tends to soften the plates of the battery driving the acid out of the same rapidly which increases the specific gravity of the battery and further softens and breaks down the sulphation on the surface of the plates, and that, by use of this instrument functioning in the manner stated, a battery can be charged in about one-fortieth of the time in which it is possible to charge a battery by methods now commonly in use. This is due to the rapidity with which the acid, which has previously been absorbed by the plates, is driven therefrom. This increases the specific gravity of the acid solution in the battery raising the level thereof as will be readily understood and softens the lead plates whereby they are in condition to store a greater charge of current than with plates that have become hard through misuse or otherwise and further by breaking down and softening the sulphate the entire area of the plates is freed to action of the acid. It is to be understood that the spider is revolved in the usual instances at a speed of about thirty to forty revolutions per minute but this may vary as desired to increase or decrease the rapidity of change in the amperage of current flow.

Having thus fully described my invention, what I claim and desire to secure by Letters Patent of the United States is—

In apparatus for charging batteries, the combination with a plurality of batteries and a charging circuit therefor, of an electrical device in the circuit consisting of a series of spaced contacts arranged in a circle, the batteries each being connected with a contact in equidistantly spaced relation about the circle, a resistance element connected with each of the contacts, there being an equal portion of the said element between each pair of contacts, a ring in insulated concentric relation with the said contacts connected with the charging circuit, and a series of continuously rotatable brushes bridging the ring and contacts, the brushes being in equidistantly spaced relation and causing the current to flow to each battery in surges ranging from high to low amperage as each brush approaches and recedes from a contact connected with a battery.

In testimony whereof, I sign this specification.

JAMES D. BROADFOOT.